Jan. 3, 1933.  K. M. VAN GESSEL  1,892,819
METHOD OF SOLDERING TOGETHER METAL PARTS
Filed March 3, 1930
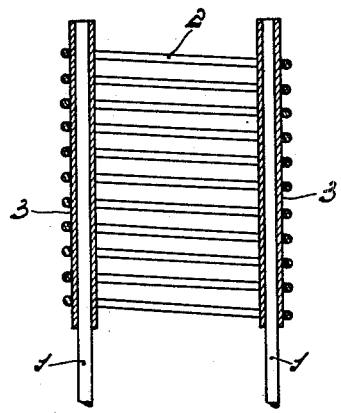
Inventor:
K. M. van Gessel,
by
Langner, Parry, Card & Langner
Att'ys.

Patented Jan. 3, 1933

1,892,819

UNITED STATES PATENT OFFICE

KAREL MARINUS VAN GESSEL, OF EINDHOVEN, NETHERLANDS, ASSIGNOR TO N. V. PHILIPS' GLOEILAMPENFABRIEKEN, OF EINDHOVEN, NETHERLANDS

METHOD OF SOLDERING TOGETHER METAL PARTS

Application filed March 3, 1930, Serial No. 432,880, and in the Netherlands April 27, 1929.

The invention relates to a method of soldering together metal parts and to objects comprising parts which are soldered together. By a soldering process is meant a process in which the metal objects to be united are covered at the joint by another material consisting of a metal or metal alloy and liable, when heated, to adhere to the metal objects. This jointing material is usually referred to as "solder".

It has been found that in many cases metals can be successfully soldered together with the aid of zirconium. More particularly, this jointing method can advantageously be used for soldering together parts consisting of a refractory material such, for example, as tungsten, molybdenum, tantalum. The method according to the invention may be utilized with satisfactory results, for example, for attaching a wire at several points to a rod (for example, for the attachment of a grid wire of an electric discharge tube to a grid support), to which rod is applied a strip or sheath of zirconium to which the wire is sealed.

In an object comprising metal parts which are joined to one another in the above-described manner, zirconium is provided at the joints between the said parts.

The invention may be carried out in the following way. A piece of zirconium is welded to a refractory metal body. To this end, this piece and this body are brought together, whereafter the joint is strongly heated, for example by a gas flame, whereas the piece of zirconium and the refractory body may be pressed together at the same time; after that another refractory body is welded to the piece of zirconium in the same way as the zirconium was welded to the first refractory body.

The invention will be more clearly understood by referring to the accompanying drawing which represents by way of example, a grid of an electric discharge tube, in which the grid supports and the grid wire are attached to one another in accordance with the invention.

Referring to the drawing, the grid supports and the grid wire are denoted by 1 and 2 respectively. These members may consist of different materials but the invention is particularly applicable to the jointing together of objects consisting of a refractory material such as molybdenum. The shown supports and the grid wire are joined to one another with the aid of zirconium which is applied to the grid supports as thin cylindrical sheaths 3. It is also possible to secure a strip of zirconium to the grid supports by attaching the strip by an intense heating e. g. with the aid of a gas flame to the rod either at some points or over its entire length. The attachment of the various turns of the grid wire to the zirconium cylinders or strips is effected by heating the joints. It has been found that thus a very satisfactory connection between the grid supports and the grid wire can be obtained, which is not the case if it is tried to weld the wire directly to the molybdenum supports.

What I claim is:—

1. A method of joining together refractory metal bodies, according to which method one of said bodies is at least partly coated with zirconium, another refractory metal body being welded to said zirconium.

2. A method of joining together refractory metal bodies according to which method a piece of zirconium is welded to one of said refractory bodies, another refractory body being welded to said piece of zirconium.

3. A method of joining together refractory metal bodies of a vacuum tube according to which method one of said bodies is at least partly coated with zirconium, another refractory metal body being welded to said zirconium.

4. A method of joining together refractory metal bodies of a vacuum tube, according to which method a piece of zirconium is welded to one of said refractory bodies, another refractory body being welded to said piece of zirconium.

5. A method of making a grid for an electric vacuum tube, according to which process a pair of refractory metal rods are at least partly coated with zirconium, a refractory metal grid wire being wound around said rods and welded to said coating of zirconium.

6. A method of making a grid for an electric vacuum tube, according to which process sheaths of zirconium are welded to a pair of refractory metal rods, a refractory metal grid wire being wound around said rods and welded to said sheaths of zirconium.

7. A vacuum tube comprising refractory metal bodies, said bodies being joined together by an intermediate layer of zirconium.

8. A vacuum tube comprising a grid having a pair of refractory metal rods coated at least partly with zirconium and a refractory metal grid wire welded to said coating of zirconium.

In testimony whereof I have signed my name to this specification.

KAREL MARINUS VAN GESSEL.